United States Patent [19]

Resch

[11] Patent Number: 5,051,148

[45] Date of Patent: Sep. 24, 1991

[54] DEVICE FOR WELDING SYNTHETIC RESIN SHEETING

[76] Inventor: Wilfried Resch, Spitalgasse 23, A-9300 St. Veit/Glan, Austria

[21] Appl. No.: 540,691

[22] Filed: Jun. 20, 1990

[30] Foreign Application Priority Data

Jun. 29, 1989 [AT] Austria ................................ 1604/89

[51] Int. Cl.⁵ .......................... B44C 7/00; B32B 35/00
[52] U.S. Cl. .................................... 156/358; 156/544; 156/555; 156/579; 156/499
[58] Field of Search ................ 156/499, 555, 574, 544, 156/497, 82, 579, 358

[56] References Cited

U.S. PATENT DOCUMENTS

| 3,832,262 | 8/1974 | Rubaud | 156/499 X |
| 4,146,419 | 3/1979 | Neidhart | 156/499 X |
| 4,744,855 | 5/1988 | Ellenberger et al. | 156/499 |
| 4,834,828 | 5/1989 | Murphy | 156/499 X |
| 4,872,941 | 10/1989 | Lippman et al. | 156/499 X |
| 4,923,558 | 5/1990 | Ellenberger et al. | 156/499 |

FOREIGN PATENT DOCUMENTS

| 359277 | 10/1980 | Australia . |
| 363676 | 8/1981 | Australia . |
| 381276 | 9/1986 | Austria . |
| 385719 | 5/1988 | Austria . |
| 2510521 | 9/1975 | Fed. Rep. of Germany . |
| 968944 | 4/1973 | German Democratic Rep. . |

Primary Examiner—David A. Simmons
Assistant Examiner—J. Sells
Attorney, Agent, or Firm—Young & Thompson

[57] ABSTRACT

A welding device for joining overlapping lengths of thermoplastic synthetic resin along the margins comprises two welding rollers (8) and (9). One of the welding rollers (9) is arranged at a lever (7) pivotably supporting at the base member (1) of the device, this lever being associated with a setting means (24). The pressure exerted by the setting means (24) on the lever (7) is detected by way of a pressure sensor (23) and fed to a control and/ or display unit. The device exhibits a wedge-shaped heated member (14) associated with the gap between the two welding rollers (8) and (9), this member being displaceably guided in the base member (1). The wedge-shaped heated member (14) is supported at a support, by way of which it is adjustable in the base member (1), via a pressure sensor (43) transmitting signals corresponding to the contact pressure of the wedge-shaped heated member (14) against the sheets of synthetic resin entering in between the welding rollers (8) and (9) to a control and/or display unit. Furthermore, a temperature probe is provided in the wedge-shaped heated member (14) which transmits its signals to a thermostat control. The energy supply to the welding device is effected by way of a portable accumulator via a cable (50).

10 Claims, 4 Drawing Sheets

DEVICE FOR WELDING SYNTHETIC RESIN SHEETING

The invention relates to a device for welding lengths of synthetic resin overlapping each other along the margin, by means of a wedge-shaped heated member directed toward the gap between welding rollers wherein the wedge-shaped heated member is arranged on a support displaceably guided on a guide means attached to a base member of the device, one welding roller being supported at the base member and the other welding roller being supported at a lever mounted at the base member to be pivotable about an axle in parallel to the axes of rotation of the welding rollers, wherein wheels or casters are provided at the base member and at the pivotably arranged lever, the device being movable by way of these wheels or casters, each welding roller being coupled with a drive motor.

Such devices have been known, for example, from Austrian Patents 359,277; 363,676; and 381,276.

The conventional devices exhibit the following disadvantages, inter alia:

For one thing, in the conventional devices, the pressure exerted by the welding rollers on the edges, to be bonded, of the lengths of synthetic resin placed in overlapping relationship, as well as the contact pressure of the wedge-shaped heated member can be adjusted only manually and depending on feel and experience. Thus, it is impossible to obtain reproducible values for the pressure of the welding rollers and the contact pressure of the wedge-shaped heated member. Furthermore, the positioning of the wedge-shaped heated member on the edges of the lengths of synthetic resin sheeting to be welded together, which edges enter the gap between the welding rollers, and its withdrawal after the welding work has been performed are carried out by hand, representing an additional burden on the personnel utilizing the device.

Furthermore, the temperature of the wedge-shaped heated member is set in the conventional devices by the operator in accordance with his or her feel; ordinarily, the temperature of the wedge-shaped heated member is raised until the sheets melt and can be welded together.

Finally, the conventional devices for bonding the edges of synthetic resin sheeting placed in over-lapping relationship have the drawback that the electric cables provided for energy supply must be made of the same length as the project to be insulated, so that cable lengths of 30–40 m result, for example, in the production of tunnel insulations; this makes handling of the device additionally difficult.

Austrian Patent 385,719 discloses a welding device for lengths or sealing sheets of thermoplastic synthetic resin. This device consists of a contact pressure unit constituted by a pair of pressure rollers with two drivable pressure rollers, the mutual spacing of which can be varied. This contact pressure unit is arranged at a holding device optionally provided with casters, this holding device also exhibiting a wedge-shaped heated member optionally displaceable between a rest position and an operative position and drivable in these positions at differing power, this heated member being located in front of the pressure rollers. In this conventional device, the two pressure rollers are driven independently of each other, one pressure roller being connected with its drive mechanism via a flexible shaft extended within a pipe bent into a U-shape.

The welding device for bonding lengths of synthetic resin sheeting known from Austrian Patent 381,276 consists of an apparatus frame, a wedge-shaped heating unit arranged to be longitudinally movable in front of the welding site, and pressure rollers lying in mutual opposition; these rollers can be urged into mutual contact and can be driven by a motor. In this conventional device, the apparatus frame is formed from two frame profile members extending in parallel to each other and being respectively connected to a pressure roller, and from a connecting member designed preferably as a tube and being rigidly attached to a frame profile member, the other free frame profile member being supported at the connecting member in a rotatable fashion by the action of a spring.

East German Patent 96,894 proposes a method for the continuous welding of thermoplastic films of polyolefins with the use of a heating element adapted to the passage of the film, in conjunction with a temperature indicator and a temperature controller, as well as with the utilization of a guide means arranged in front of the heating element, and pressure and cooling rollers arranged after the heating element, wherein a temperature of the heating die is to be used which lies above the decomposition temperature of the thermoplastic material.

DOS 2,510,521 shows an apparatus for sealing bags or sacks, with rolls for the compression and welding together of the bag rims. In order to urge the two rolls against each other, a device with a tension spring is provided which is designed so that one roll can be lifted off the other one while the rims to be welded are passing through. Furthermore, a stop is included which is fashioned so that the rolls are urged against each other with low pressure in the absence of synthetic resin films to be welded together.

The invention is based on the object of indicating a device of the type discussed hereinabove which is of a simple structure and is simple in its operation.

According to the invention, this object has been attained in that the lever carrying one welding roller is connected with an arm which is preferably perpendicular to this lever; that a pressure sensor is arranged between the free end of the arm and an adjustable stop; that the wedge-shaped heated member is guided on a guide means to be displaceable with respect to its support by means of a servomotor; and that a pressure sensor is arranged between mutually facing surfaces of the wedge-shaped heated member and of the support.

Preferred embodiments of the device according to this invention are set forth in the dependent claims.

By virtue of the device fashioned in accordance with this invention, individual ones or several of the advantages set out below can be achieved.

The pressure exerted on the edges of the sheets (films) to be welded together by the welding rollers is reproducible and can be accurately set to the respectively desired value by the pressure sensor associated with the welding rollers.

Adjustment of the heated wedge (advancement at the beginning of the welding step and, respectively, resetting after termination thereof) takes place by means of a drive motor, the contact pressure of the wedge-shaped heated member being adjustable by way of the pressure sensor and being (automatically) controllable while performing the welding operation. Due to the fact that the pressure exerted by the wedge-shaped heated member on the mutually facing surfaces of the synthetic resin sheets to be bonded together can be continuously readjusted during the welding step, any possible wear of the heated wedge is compensated for and/or variations in the thickness of the sheets to be joined together are smoothed out, without additional manual activity.

The possibility of associating the wedge-shaped heated member with a temperature probe affords a very exact regulation of the temperature of this member. This is feasible, in particular, if the device of this invention is equipped with a portable energy source, e.g. a storage battery, so that the otherwise necessary, long energy supply cables, heretofore precluding the use of a temperature probe on account of excessively great transmission lengths, can be omitted.

In case the energy supply for the device of this invention is portable and is effected, for example, via a storage battery carried by the operator, short energy supply and control cables result so that handling of the device is, last not least, also considerably simplified by the low weight thereof.

Finally, there is the possibility with the device of this invention to measure and store all of the parameters for the welding operation, such as welding pressure, velocity, and temperature, at programmable intervals. Additionally, it is also possible to store data on the operator, the project, date, and time of day, and put these data out by way of a printer.

Further details and features of the device according to the invention can be seen from the following description of the exemplary embodiment of a device of this invention for heat-sealing the edges of synthetic resin sheets placed in overlapping relationship, as illustrated in the schematic drawings wherein.

Figure 1:
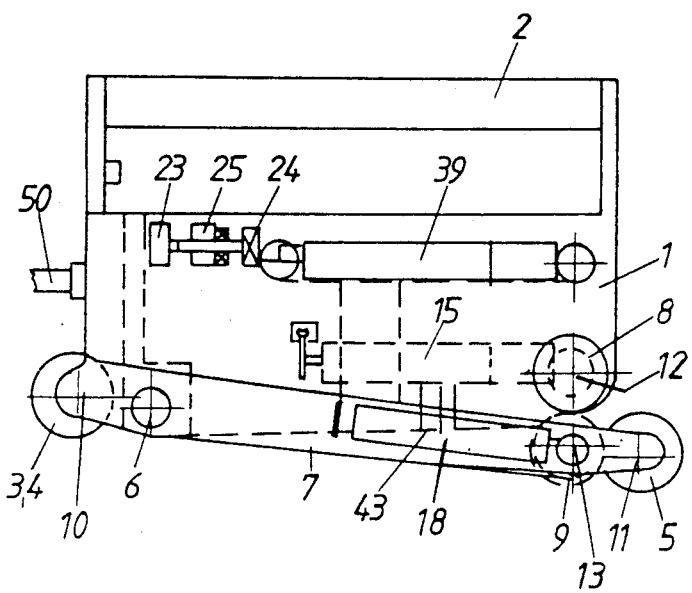
FIG. 1 shows a device in a lateral view.
Figure 2:
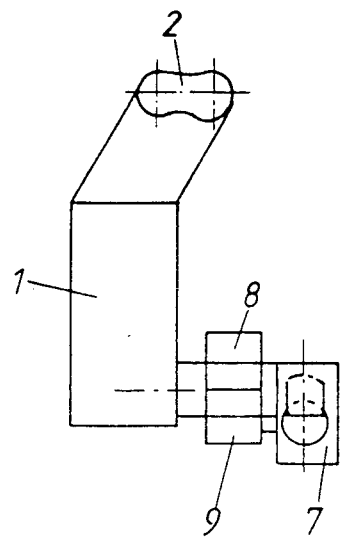
FIG. 2 shows the device as seen from the left-hand side of FIG. 1.

The welding device shown in the drawings consists of a base member 1 formed in the shape of a housing and carrying at the top a handle 2 which can be ergonomically designed, this base member being movable by way of wheels 3, 4 and 5; during execution of the welding work, the device travels from the right-hand side to the left-hand side of FIG. 1.

Figure 5:
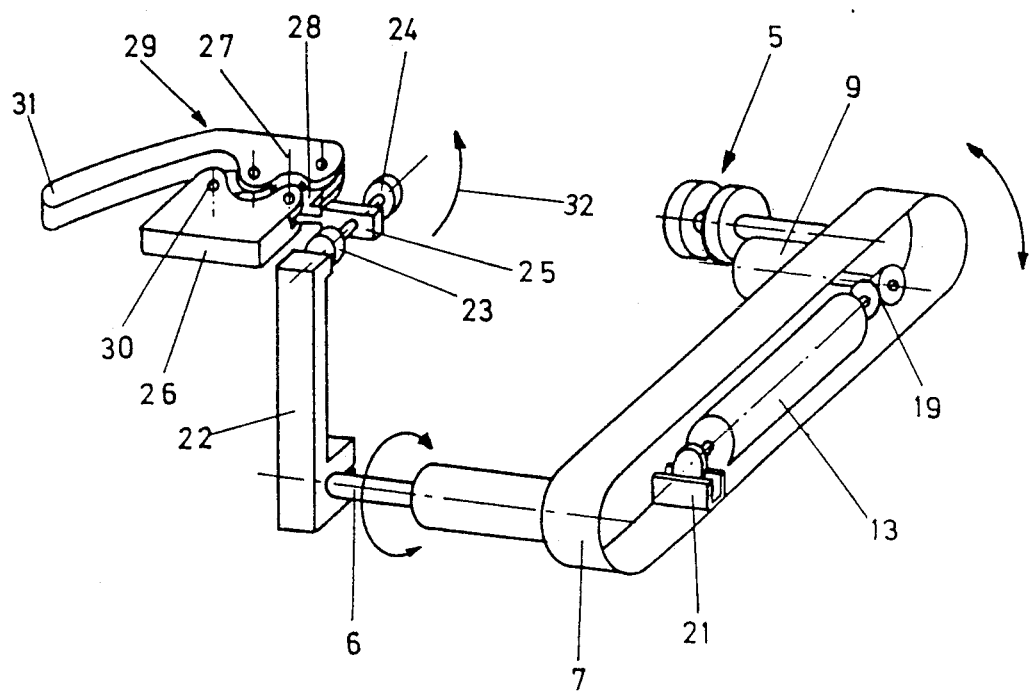
FIG. 5 shows, in an oblique view, a setting unit for the movably supported welding roller.

The wheels 3 and 4 are rotatably mounted directly to the base member 1 whereas the wheel 5—it being possible also to provide, instead of one wheel 5, two juxtaposed wheels 5 as illustrated in FIG. 5—is rotatably mounted on a lever 7, pivotably arranged in the base member 1 about an axle 6 oriented in parallel to the axes of rotation of the wheels 3, 4, 5, namely at the free end 3 of this lever.

As can be seen from the drawings, the welding device has two welding rollers 8 and 9. The upper welding roller 8 is arranged at the base member 1, and the lower welding roller 9 is mounted to the pivotably supported lever 7. The axes 10 and 11 of the wheels 3, 4 and 5 and the axes 12 and 13 of the two welding rollers 8 and 9 are oriented mutually in parallel. In this arrangement, the wheel 5 is positioned with respect to the welding roller 9 in such a way that the latter is located above a tangential plane laid jointly on the wheels 3, 4 and 5 from below.

The welding device furthermore comprises a heated member 14 having a wedge shape at its end facing the welding rollers 8 and 9. The heated member 14 is moved, during the welding step, toward the welding rollers 8 and 9 so that the edges of the sheeting (film) consisting, for example, of a thermoplastic synthetic resin, which edges are to be joined together and enter in between the welding rollers 8 and 9, slide along the heated member 14 and thus are heated to the heat-sealing temperature.

A DC motor 15 is provided in the base member 1 for the rotational drive of the welding roller 8 acting from above on the sheeting of synthetic resin to be bonded; this motor drives, by way of a miter gear 16, the shaft 17 of the welding roller 8.

A DC motor 18 is provided for driving the welding roller 9 supported at the pivotable lever 7; this motor drives the welding roller 9 by way of a miter gear 19. Revolution measuring units 20 and 21 are associated with both drive motors 15 and 18, transmitting the numbers of revolution detected by them to a control unit (not illustrated) so that the two welding rollers 8 and 9 are driven at the same peripheral speed. This ensures that there cannot be any relative movements of the synthetic resin sheets to be heat-sealed during the welding step.

It can be seen from FIG. 5 that an arm is joined to the pivotably supported lever 7 via the axle 6 of the latter; this arm is oriented approximately perpendicularly to the lever 7 and is designed as a bar spring 22. By way of a pressure sensor 23, the free end of a setscrew 24 engages the free end of the bar spring 22. The setscrew 24 is threaded into a tapped hole in a block 25, and its respectively set position can be secured with the aid of a counter nut, not shown.

The block 25 is mounted in the base member 1 or in a support 26 connected with the latter, to be pivotable about an axis 27 extending approximately in parallel to the bar spring 22 and approximately perpendicularly to the setscrew 24. The block 25 furthermore comprises an extension 28, the free end of which is connected with a toggle lever arrangement 29, the latter, in turn, being supported at 30 on the support 26 or on the base member 1. By operating the toggle lever arrangement 29 via its handle 31, the block 25 and thus the setscrew 24 can be swung out from the effective position shown in FIG. 5 in the direction of arrow 32. With a swung-out setscrew 24, the latter no longer acts on the free end of the bar spring 22 so that the lever 7 is freely pivotable, and the welding roller 9 can be moved away from the other welding roller 8; this is necessary for an easy introduction of the edges, to be bonded, of the synthetic resin sheets between the welding rollers 8 and 9. By a return pivoting of the toggle lever arrangement 29, the setscrew 24 again resumes its operative position, and the value, previously set with the aid of the setscrew 24, for the contact pressure of the welding roller 9 against the welding roller 8 (with synthetic resin sheets inserted therebetween) is reestablished.

Setting of the desired value for the pressure exerted by the welding rollers 8 and 9 on the sheets is made very simple by the pressure sensor 23 since the latter transmits signals corresponding to the prevailing pressure to an indicator device (not shown).

As mentioned hereinabove, the wedge-shaped heated member 14 is adjustable with respect to the two welding rollers 8 and 9. The adjusting unit provided for this purpose in the illustrated embodiment of the device is shown in FIG. 4.

Figure 4:
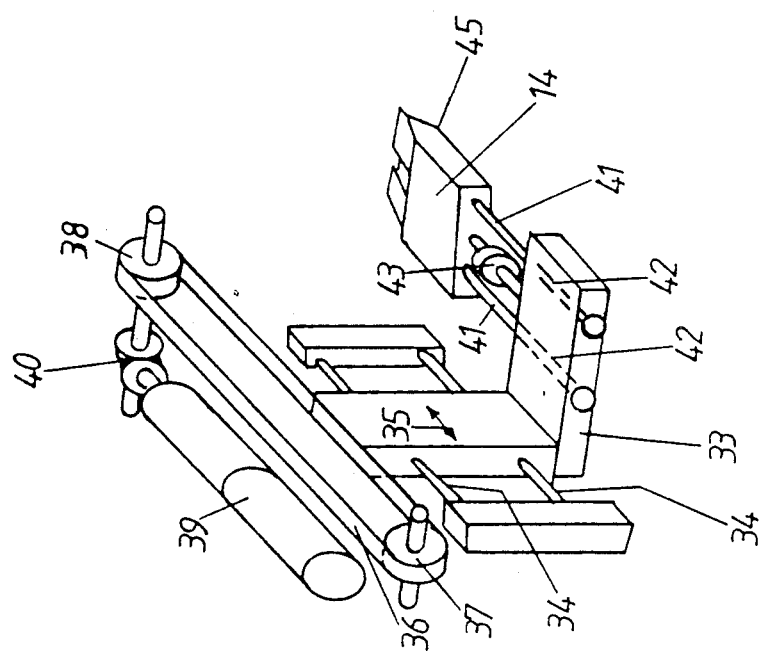
FIG. 4 is an oblique view of the adjusting unit for the wedge-shaped heated member.

It can be seen from FIG. 4 that the wedge-shaped heated member 14 is arranged on a support 33 of an approximately L-shaped design. The support 33 is, in turn, displaceable, by way of two guide rods 34 attached to the base member 1, in the direction of the double arrow 35. In order to adjust the support 33 and thus the wedge-shaped heated member 14, the support 33 is connected with a flat side of an endless conveying member 36 which latter is guided over two guide rollers 37, 38. A servomotor 39 is provided for operating the endless conveying member 36 and thus the support 33 and, in the final analysis, the wedge-shaped heated member 14 in the direction of double arrow 35; this servomotor drives, by way of a miter gear 40, the shaft of the guide roller 38.

The wedge-shaped heated member 14 is attached to two bars 41 displaceably guided in bores 42 in the horizontal section of the support 33 in the direction of double arrow 35. Between the mutually facing end surfaces of the support 33 and of the wedge-shaped heated member 14, a pressure sensor 43 is arranged. The pressure sensor 43 transmits signals corresponding to the contact pressure of the wedge-shaped heated member 14 against the sheets entering in between the welding rollers 8 and 9 to a control unit and optionally also to a display unit. With evaluation of these signals, the control unit operates the servomotor 39 if the contact pressure detected by the pressure sensor 43 does not correspond to the desired and predetermined value.

In order to render the device of this invention maximally lightweight, the housing-like base member 1 and the mechanical drive elements, as well as further essential components, such as, for example, the pivotably supported lever 7, are manufactured from heat-tempered cast aluminum whereby also good corrosion resistance is ensured.

The velocity at which the welding rollers 8 and 9 are driven in synchronism by their drive motors 15 and 16 by means of the revolution measuring units 20, 21 can be recorded.

The (welding) pressure exerted by the welding rollers 8 and 9 is expended by the bar spring 22 under the pressure of the setscrew 20, and is detected by the pressure sensor 23. By means of the above-described structure of the adjusting mechanism for the pivotably mounted lever 7, the once-set welding pressure is also regained after the setscrew 24, with the aid of the toggle lever arrangement 29, has been returned into its operative position after introduction of sheets in between the spaced-apart welding rollers 8 and 9.

The wedge-shaped heated member 14 can optionally be designed with pneumatic support so that it shows low wear and tear. However, it is also possible to fashion the member of a ceramic material, e.g. of steatite or of a metal casting (e.g. brass).

A temperature probe 45 is associated with the wedge-shaped heated member 14, transmitting a signal corresponding to the temperature of the wedge-shaped heated member 14 to a display and/or control unit. Ordinarily, the temperature at the tip of the wedge-shaped heated member 14 will be 230°-240° C. in case sheets of a thermoplastic synthetic resin (e.g. polyvinyl chloride or another polyolefin) are welded together.

As mentioned above, the contact pressure with which the wedge-shaped heated member 14 is urged against the sheets entering in between the welding rollers 8 and 9, and which is expended by the servomotor 39, is detected by the pressure sensor 43 and likewise transmitted to a control and/or display unit.

Figure 6:
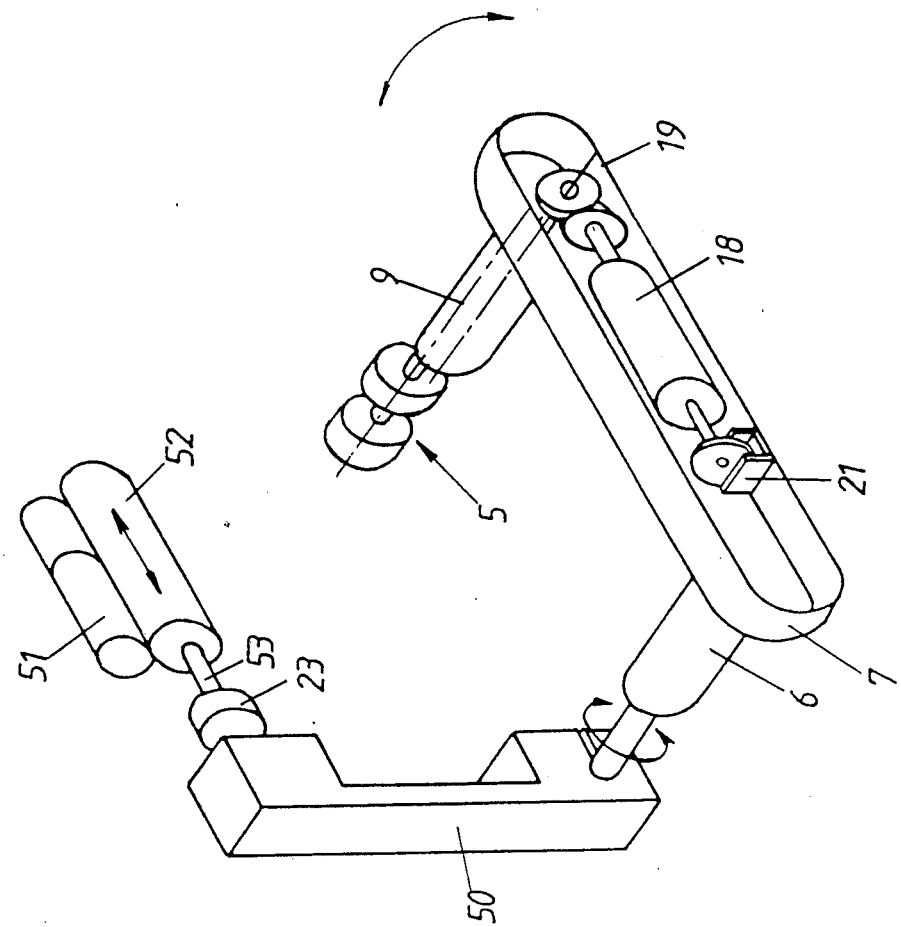
FIG. 6 shows another embodiment of the setting unit.

In the embodiment shown in FIG. 6, the arm 50 connected to the lever 7 by way of its axle 6 is fashioned to be rigid and is, for example, fixedly clamped onto the axle 6. A stop 53 adjustable by means of a servomotor 51 and a gear unit 52, e.g. a worm gear, is associated with the free end of arm 50. Between the stop 53 and the arm 50 the pressure sensor 23 is arranged which controls the servomotor 51 in such a way that in all cases the desired, preselectable contact pressure prevails between the welding rollers 8 and 9.

Energy is supplied to the device according to the invention by way of portable accumulators; in this arrangement, the housing accommodating the accumulators can also contain the required display and control units for the control and operation of the device of this invention.

Figure 3:
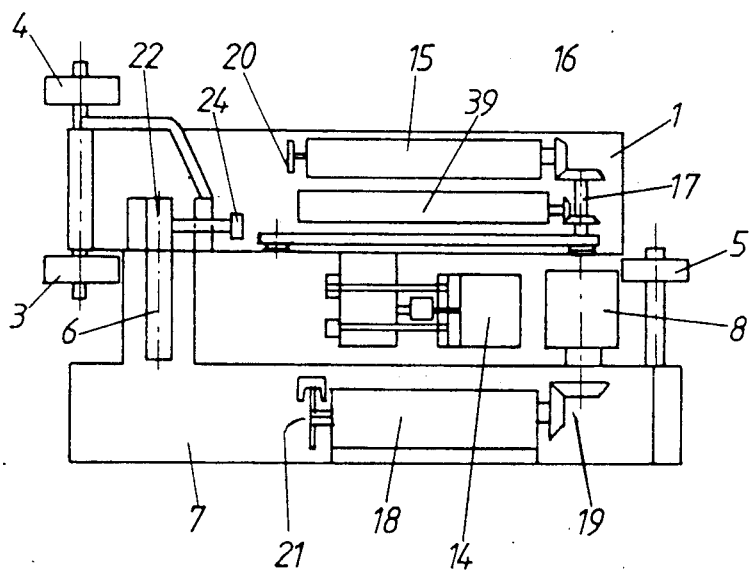
FIG. 3 is a top view of the device in FIG. 1.

It is also possible to provide a program run in this control unit, initiating, after checking the charging condition of the accumulator, the heating up of the wedge-shaped heated member 14 and transmitting a signal once the temperature required for welding and detected by the thermometer probe 45 has been attained. Thereupon, the operator presses a starting button arranged at the operator's control panel, the wedge-shaped heated member 14 is advanced into the heat-sealing position by its servo device, and, after the necessary welding pressure has been set, the bonding of the edges of the sheets laid out in mutually overlapping relationship is automatically initiated by starting the drive motors 15 and 18. At the end of a welding step, a stop button is pressed, the advance is terminated by stopping the motors 15 and 18, the wedge-shaped heated member 14 is moved back into its withdrawn starting position, illustrated in FIG. 3, and optionally the temperature of the wedge-shaped heated member 14 is lowered in order to save energy.

The accumulators accommodated in the energy supply section are suitably designed so that there is adequate energy for two weld seams having a length of 30 to 70 m.

I claim:

1. Device for welding lengths of synthetic resin overlapping each other along the margin, by means of a wedge-shaped heated member (14) directed toward the gap between welding rollers (8, 9) wherein the wegdeshaped heated member (14) is arranged on a support (33) displaceably guided on a guide means (34) said guide means (34) being attached to a base member (1) of the device, one welding roller (8) being supported at the base member (1) and the other welding roller (9) being supported at a lever (7) mounted at the base member (1) to be pivotable about an axle (6) in parallel to the axes of rotation (12, 13) of the welding rollers (8, 9), wherein wheels or casters (3, 4, 5) are provided at the base member (1) and at the pivotably arranged lever (7), the device being movable by way of these wheels or casters, and wherein each welding roller (8, 9) is coupled with a drive motor (15, 18), characterized in that the lever (7) carrying one welding roller (9) is connected with an arm (22, 50) which is preferably perpendicular to this lever; that a pressure sensor (23) is arranged between the free end of the arm (22) and an adjustable stop (24, 53) for sensing the pressure between said welding rollers (8, 9); that the wedge-shaped heated member (14) is guided on a guide means (41, 42) to be displaceable with respect to its support (33) by means of a servomotor (39); and that a pressure sensor (43) is arranged between mutually facing surfaces of the wedge-shaped heated member (14) and of the support (33) for sensing the contact pressure of the wedge-shaped heated member (14) against the synthetic resin.

2. Device according to claim 1, characterized in that the arm is designed as a bar spring (22).

3. Device according to claim 1, characterized in that the stop (53) can be adjusted by means of a servomotor (51) and a gear unit (52).

4. Device according to claim 1, characterized in that the stop is a setscrew (24) threaded into a block (25) connected with the base member (1).

5. Device according to claim 4, characterized in that the block (25) into which the setscrew (24), is threaded which is secured against unintentional turning by means of a counter nut is pivotable in the base member (1) about an axis (27) perpendicular to the setscrew (24), and that the block (25) has an extension (28) coupled with a toggle lever arrangement (29) which latter is supported in the base member (1) or in a support (26) connected thereto, wherein the toggle lever arrangement (29) preferably exhibits an operating handle (31).

6. Device according to claim 1, characterized in that both drive motors (15, 18) for the welding rollers (8, 9) are equipped with revolution measuring units (20, 21).

7. Device according to claim 1, characterized in that the support (33) of the wedge-shaped heated member (14), which support is preferably designed to be angled, is connected with a flat face of an endless conveying member (36), for example a gear belt, placed over guide rollers (37, 38) supported in the base member (1), and that the servomotor (39) is coupled with one (38) of the guide rollers (37, 38).

8. Device according to claim 7, characterized in that the servomotor (39) is coupled with the shaft of one (38) of the guide rollers (37, 38) for the endless conveying member (36) by way of a miter gear (40).

9. Device according to claim 1, characterized in that the wedge-shaped heated member (14) is attached to bars (41) guided in bores (42) in the support (33) for the heated member (14).

10. Device according to claim 1, characterized in that the support (33) for the heated member (14) is displaceably guided on guide rods (34) attached to the base member (1) of the device.

* * * * *